United States Patent [19]
Fitzpatrick

[11] Patent Number: 5,732,500
[45] Date of Patent: Mar. 31, 1998

[54] FISHING POLE REEL MOUNT ADAPTATION

[76] Inventor: Peter J. Fitzpatrick, 467 Kearny Ave., Kearny, N.J. 07032

[21] Appl. No.: 616,823
[22] Filed: Mar. 15, 1996
[51] Int. Cl.$^6$ .................................................. A01K 87/06
[52] U.S. Cl. ............................................ 43/4; 43/22
[58] Field of Search ................................ 43/4, 19, 22, 25

[56] References Cited

U.S. PATENT DOCUMENTS

| | | | |
|---|---|---|---|
| 1,154,123 | 9/1915 | Manning | 43/22 |
| 2,069,977 | 2/1937 | Spencer | 43/22 |
| 3,358,399 | 12/1967 | Waldmann | 43/4 |
| 3,419,992 | 1/1969 | Strahm | 43/22 |
| 3,462,870 | 8/1969 | Terilli | 43/4 |
| 4,498,641 | 2/1985 | Steudle | 43/22 |
| 4,815,228 | 3/1989 | Abel | 43/22 |

Primary Examiner—Kurt Rowan
Attorney, Agent, or Firm—Conrad Clark, Patent Attorney

[57] ABSTRACT

An adaptor allows a known fishing pole to receive at least two fishing reels for being simultaneously used. The adaptor includes a mounting foot that is designed to be received in the structure of the known pole that receives a single fishing reel. Another part of the adaptor is designed to receive the two or more fishing reels and to support them on the fishing pole.

The two reels may be used to fish at large distances by attaching a conveying device, for example a balloon, to one of the lines. The second of the lines passes through a ring attached to the first line for carrying the second line away from the fisherman.

4 Claims, 5 Drawing Sheets

5,732,500

FISHING POLE REEL MOUNT ADAPTATION

FIELD OF INVENTION

This invention relates to fishing poles and the mounting of reels thereon, more specifically to the mounting of more than one reel on the same pole by means of an adapter for this purpose.

DESCRIPTION OF PRIOR ART

The purpose of this invention is to provide a means whereby a person, especially a handicapped person, can utilize a fishing pole with reels to reach out into water at a distance in excess of several thousand feet.

Heretofore, fishing poles, or rods, consisted of a long straight piece of wood or specially fabricated plyable material to which a reel could be mounted and lures and a weight or sinker would be added to the fishing line thereof.

The method of placing said lures in the water was and is by the technique of casting, to get said lure out into the water as far as possible and then use various means of reeling in and then the casting ritual is repeated, sometimes for many hours.

This method of fishing can be an enjoyable exercise for a person who has no handicap and if he catches a fish it adds to his or her enjoyment, but a person who is handicapped could never enjoy the sport of fishing because the strenuous ritual of casting could prove to be more than they could bear physically.

Fishing poles of various lengths, shapes and designs are known in the prior art, but none could be found which were adaptable to fishing poles which had a plurality of reels and lines.

My invention however, provides a means which transforms the ordinary fishing pole, to a fishing pole on which a plurality of said reels and lines may be mounted, and which allows its user, even a handicapped person, to extend said fishing lines and lures etc., out into water which is many hundreds of yards away.

The user will accomplish this without having to cast the fishing lines and lures etc., and without the use of or need of a boat or a floatation device.

SUMMARY

In accordance with the invention, a novel fishing concept is provided which is capable of allowing a person, even a handicapped person, to fish in waters heretofore unreachable without the use of a boat or a floatation device.

The device of the instant invention comprises an adaptation of a fishing reel mounting foot to incorporate an elongated support stem which runs longitudinal from a point near the front of the foot, but leaving enough of the foot exposed to allow said foot to be inserted in the attaching shoe and locked in place and runs longitudinally to a point near the back of the foot, but leaving enough of the foot exposed to allow the rear of the foot to be inserted in the rear of the attaching shoe and locked in place, in a fishing rod's mounting foot. The elongated stem which is high enough to allow clearance for a person to manipulate tightening screws etc., supports a bridge which can be made of any durable material and is of a similar shape and diameter as the fishing rod.

The bridge has a front and a rear mounting shoe, each of which will engage the mounting foot of a fishing reel, attached to its uppermost surface and will therefore support a plurality of fishing reels which may be made to turn in unison in the same direction by placement of a rubber band or the like around a point behind the winding handle of each reel, whence the turning of either handle will turn both reels. The bridge is necessarily longer than the shoe to which it is anchored in order to accommodate a plurality of mounting shoes and reels, and the front reel is preferably smaller than its rear companion since it only has to carry a five or ten pound test line, to which is attached a large air filled balloon. Said line hereinafter called a kite line is threaded through the pole's guide eyelets before being attached to balloon. It is also attached to a small split ring akin to a ring on which car keys are placed.

The rear reel may be much larger than the front reel, depending on how much line its user requires and its testing poundage. It is threaded through the fishing pole's guide eyelets and through the split ring at said balloon and then lures and weights etc., are added and about twenty feet of line is payed out, at which point a slightly larger split ring or other object is placed, consequently when both reels are allowed to free-wheel (clutches released) in the wind, said balloon will carry the lures etc., out as far as the user allows them to go. When it is desirable said user may stop the payout of the kite line by applying said clutch and allow the fishing line to continue until it is deep enough in the water to start fishing, jigging and reeling in etc. It should be noted that a battery operated 'reeling device' may be attached to the rear end of the rod in a known fashion.

When it is desirable for said user to reel in said slightly larger split ring or other object being larger than the kite line ring, will also help in reeling in said kite line.

OBJECTS AND ADVANTAGES

Accordingly, several objects and advantages of my invention are: To allow its user to overcome the limitations of casting his or her fishing line from a pier or the beach or the rocks of the shoreline etc.

To allow handicapped people to enjoy of fishing etc.

To allow its user to fish in waters which were previously only accessible by boats etc.

Further objects and advantages of my invention will become apparent from a consideration of the drawings and ensuing description of it.

Drawing reference numerals.

2. FOOT.
4. STEM.
6. BRIDGE.
8. HEEL. of shoe
10. HEEL. of shoe
12. TOE. of shoe
14. TOE. of shoe
16. DRAWBAR.
18. DRAWBAR.
20. LOCKING PLATE.
22. LOCKING PLATE.
24. LOCKING BOLT.
26. LOCKING BOLT.
28. FISHING POLE.
30. KITE LINE.
32. FISHING LINE.
34. SMALL SPLIT RING.
38. LARGER SPLIT RING.
36. INFLATABLE BALLOON.
40. WEIGHTS or SINKERS.
42. BAIT or LURE.

DETAILED DESCRIPTION OF THE INVENTION

Figure 1:
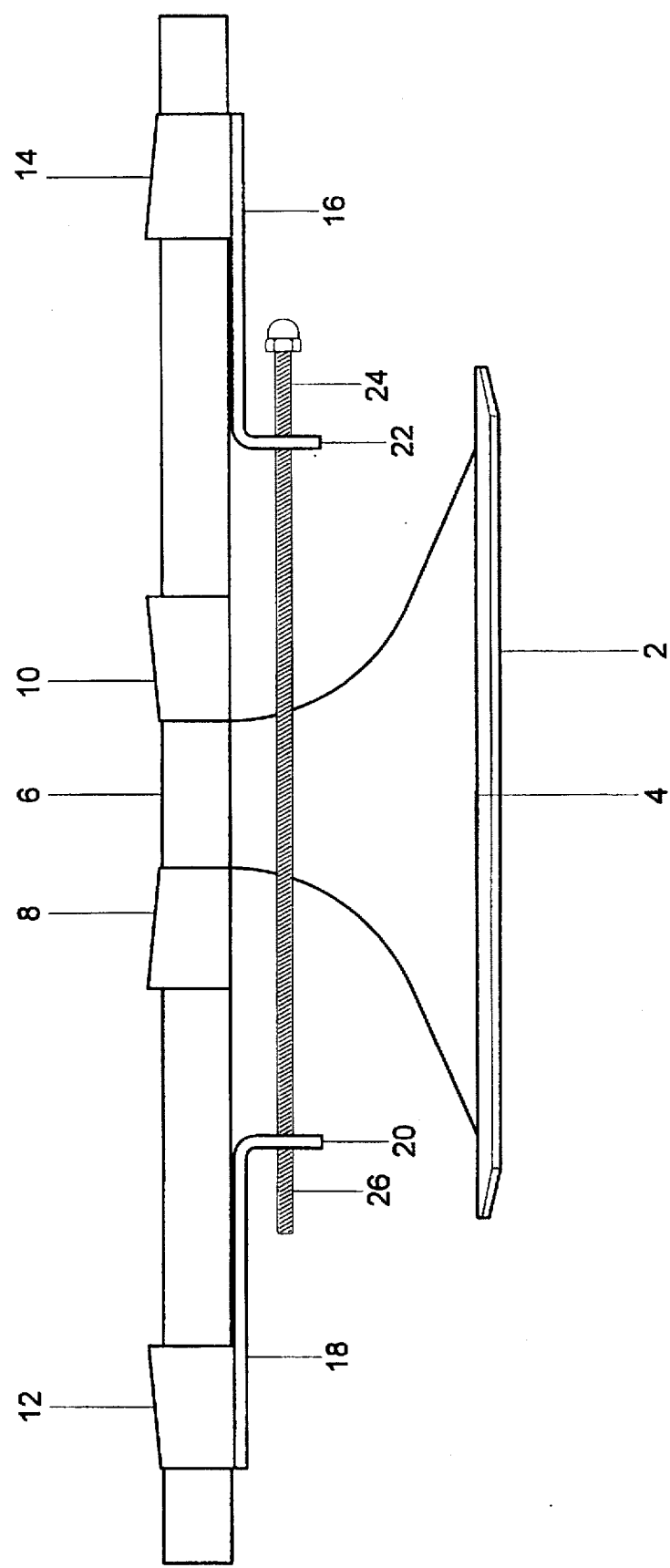
FIG. 1 is a side view of a preferred embodiment of the invention.
Figure 2:
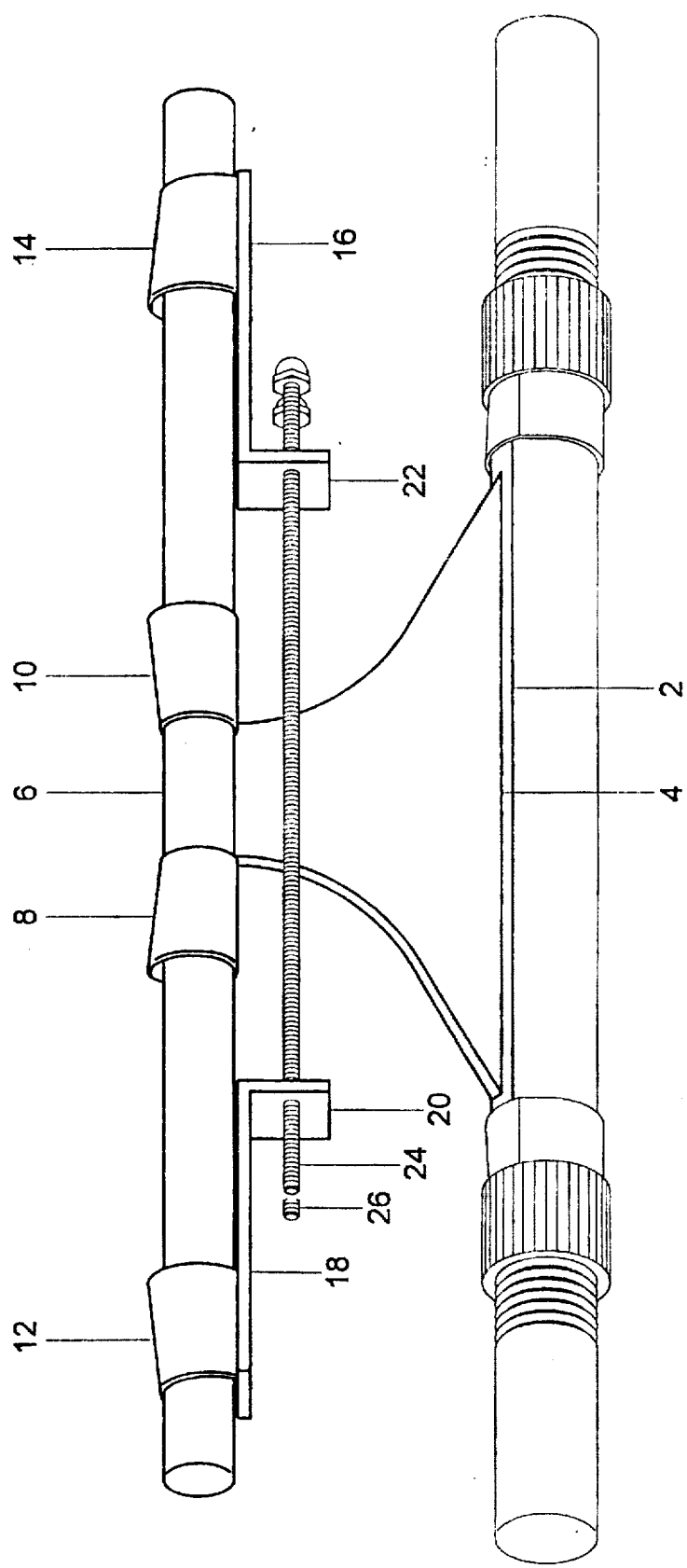
FIG. 2 is a frontal view of the adaptor of FIG. 1 showing the device attached to a section of fishing pole.
Figure 3:
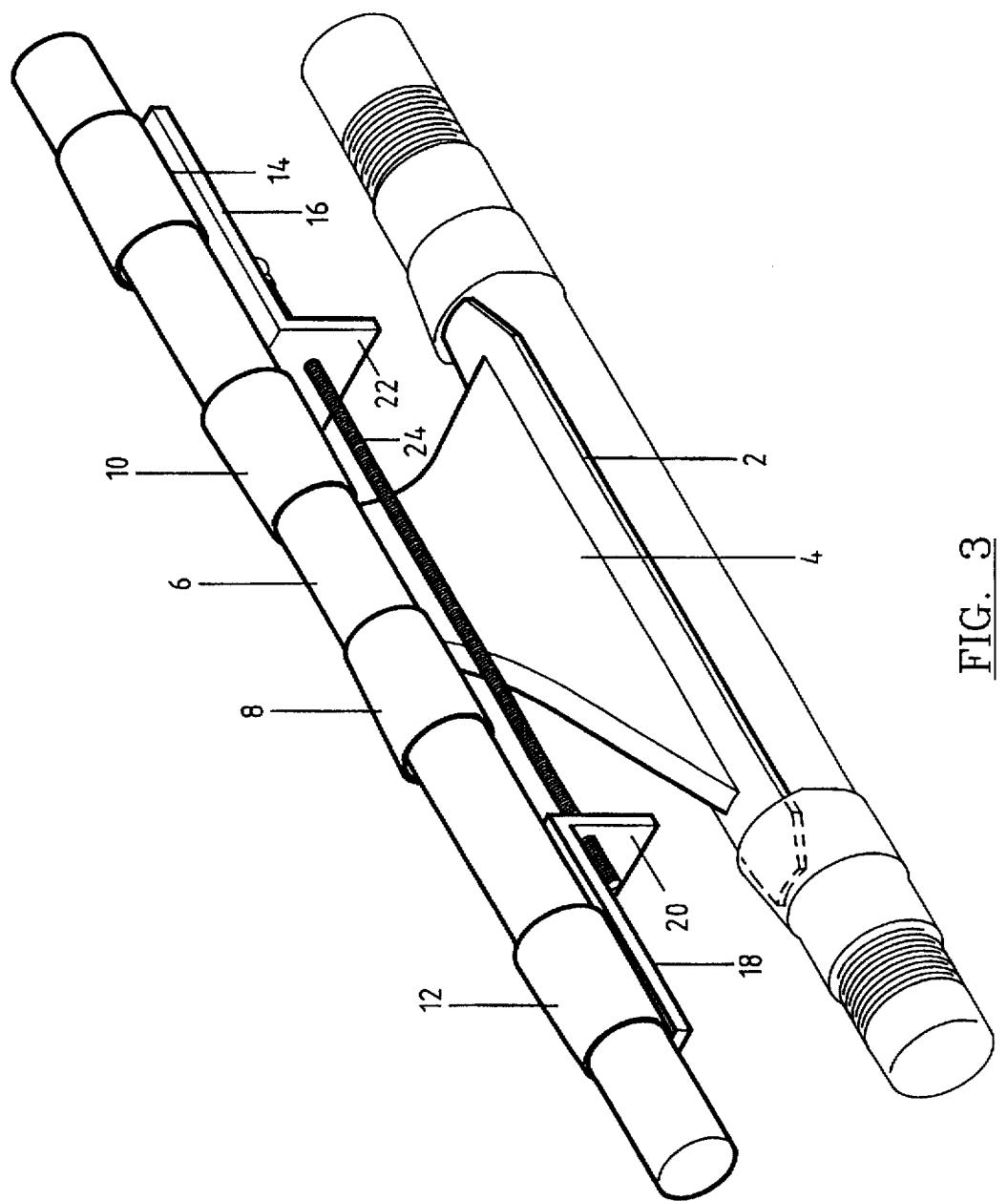
FIG. 3 is a top view of that shown in FIG. 2.
Figure 4:
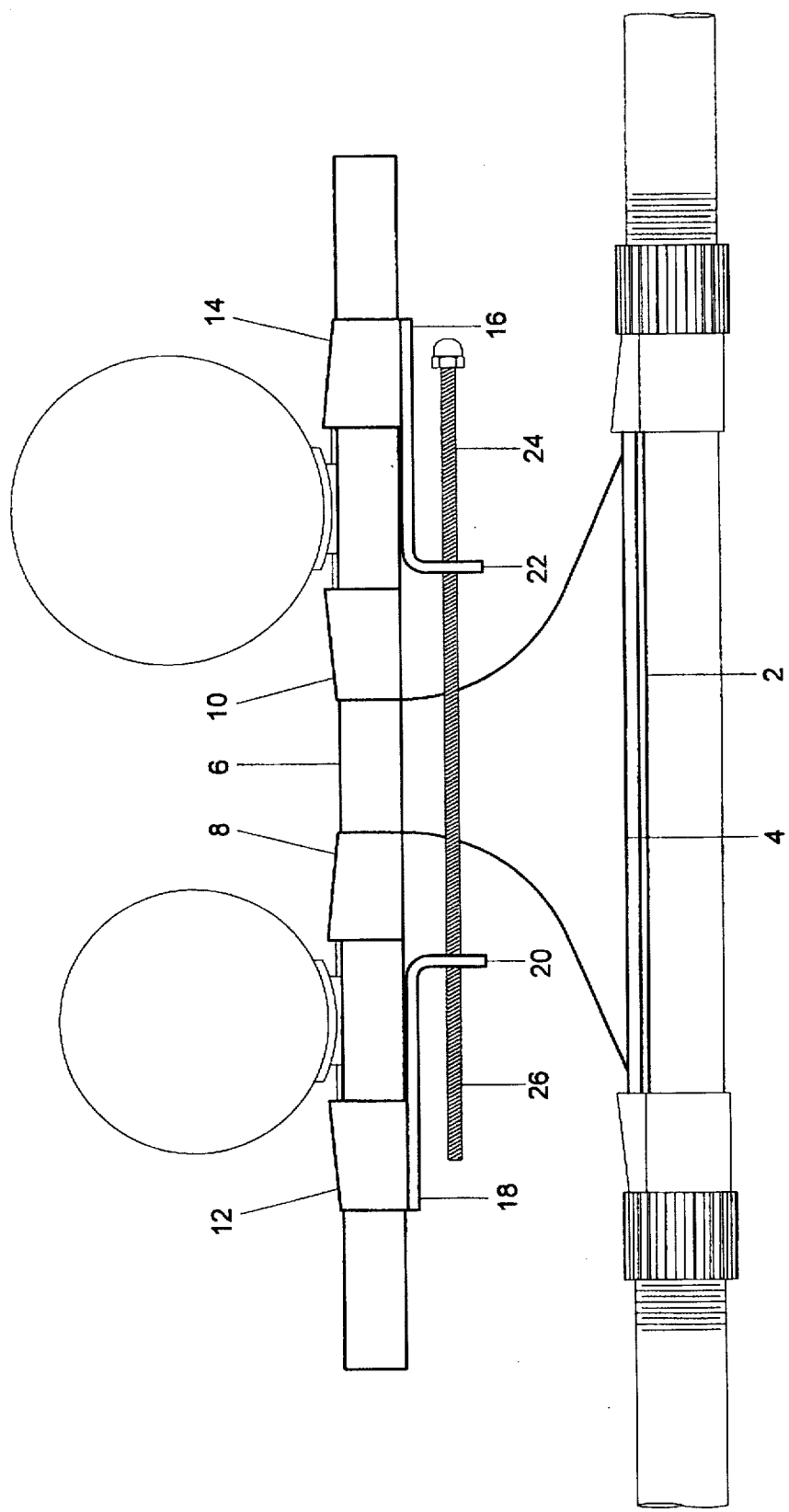
FIG. 4 is a side view of that shown in FIG. 2 with reels attached.

With reference to FIGS. 1. Through 4. a preferred embodiment of the improvement, an adaptor in accordance with the invention comprises a mounting foot (2) for attachment of reels to a fishing pole which has a mounting 'shoe', a stem (4) on which a bridge (6) is mounted, this bridge whose axis runs longitudinally with that of the pole (28) has mounted on its surface a plurality of shoes (8) (10), (12) (14), for attachably mounting a plurality of reels, each in front of the other, the heels (8) and (10) of each shoe are permanently affixed to said bridge (6), whereas said toes (12) and (14) can be moved back and forth longitudinally to allow entry of said foot into said shoe, whence the drawbars (16) and (18) are drawn together by bolts (24) and (26) which travel through treaded holes in locking plates (20) and (22) the articulation of said drawbars (16) and (18) by said bolts (24) and (26) allows for locking in place or 'removal of' any or all reels.

Figure 5:
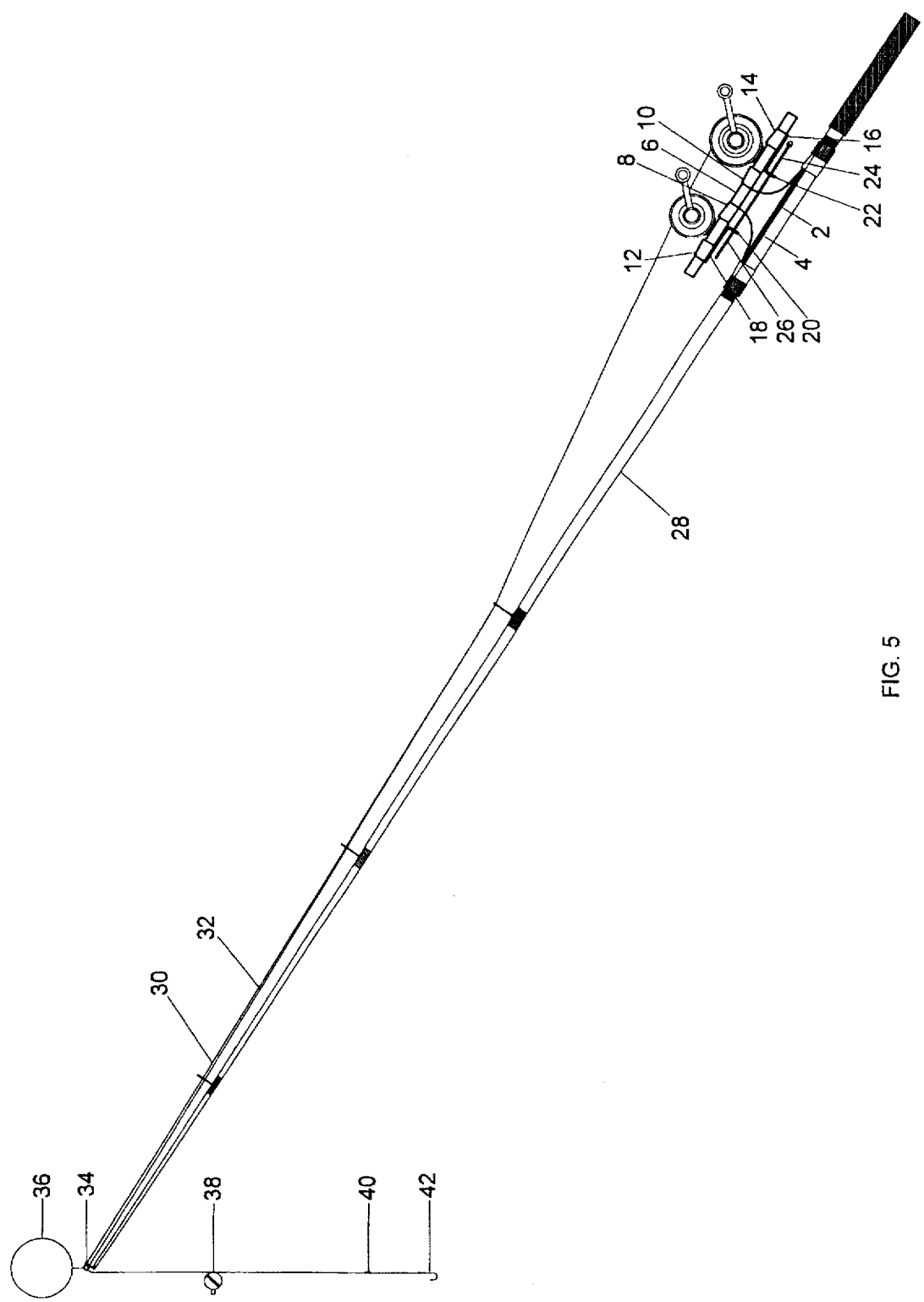
FIG. 5 is an oblique view of the device showing, reels, kite line, air conveyance means, pole and fishing line with arresting device, sinker and lure.

FIG. 5 shows the kite line (30) running from the front reel (1) through a plurality of guide eyelets on said pole (28) to a split ring (34) said split ring is also attached to an inflated baloon (36) and is larger than the small eyelet guide of the fishing pole (28). A fishing line (32) runs from the rear reel (3) through said guide eyelets on said fishing pole (28) and through the center hole of said split ring (34) where lures (42) are added and some line (32) is paid out to a point where weights or sinkers (40) are added, the amount of line (32) varies from place to place but is well known in the art. After weights or sinkers (40) are added a few inches or kilometers of line (32) are paid out and a slightly larger split ring (38) is added to said fishing line (32) other objects may be added which are slightly larger than split ring (34) to obtain the same results. Thus when the clutches of said reels (1) and (3) are released and said baloon (36) floats with the wind it will carry said fishing line, lures, weights etc away from its user and out into water which could not be reached other than by boat, canoe or other floatation device. Conversely when fishing line (32) is reeled in said split ring (38) will arrest said split ring (34) and help reel in said kite line (30) and said baloon (36) in the same manner as said baloon (36) and kite line (30) carried said lures (42) etc away from the user.

What is claimed is:

1. Apparatus for attaching a plurality of fishing reels to a fishing pole wherein said fishing pole is of the type having receiving elements for detachably receiving engaging elements of a mounting foot of a fishing reel, said apparatus comprising:

a mounting foot having engaging elements for engaging said receiving elements on said fishing pole, stem means connected to said mounting foot, and mounting means connected to said stem means, said mounting means having receiving elements for receiving the engaging elements of each of a plurality of fishing reels, said mounting means and receiving elements being oriented with respect to said mounting foot such that when said fishing reels are attached to said mounting means said fishing reels are oriented on said fishing pole such that said plurality of fishing reels can be simultaneously utilized, and further comprising means for controlling simultaneously movement of said receiving elements on said mounting means for engaging or disengaging said engaging elements of said fishing reels.

2. Apparatus according to claim 1 wherein said receiving elements are arranged in pairs, the receiving elements of each respective pair being for receiving the engaging elements of one of said fishing reels, and said means for controlling comprises a locking plate attached to a receiving element of each pair of receiving elements and two locking bolts for moving said locking plates.

3. Apparatus for attaching a plurality of fishing reels to a fishing pole wherein said fishing pole is of the type having receiving elements for detachably receiving engaging elements of a mounting foot of a fishing reel, said apparatus comprising:

a mounting foot having engaging elements for engaging said receiving elements on said fishing pole, stem means connected to said mounting foot, and mounting means connected to said stem means, said mounting means having receiving elements for receiving the engaging elements of each of a plurality of fishing reels, said mounting means and receiving elements being oriented with respect to said mounting foot such that when said fishing reels are attached to said mounting means said fishing reels are oriented on said fishing pole such that said plurality of fishing reels can be simultaneously utilized, and wherein said mounting means is an elongate rod oriented with respect to said mounting foot such that said elongate rod will be parallel to said fishing pole when said engaging elements of said mounting foot are engaged in said receiving elements of said fishing pole.

4. A fishing pole and two fishing reels, wherein said fishing pole comprises receiving elements for detachably receiving engaging elements of a mounting foot of said fishing reels, a mounting foot having engaging elements engaging said receiving elements on said fishing pole, stem means connected to said mounting foot, and mounting means connected to said stem means, said mounting means having receiving elements receiving the engaging elements of each of said fishing reels, said mounting means and receiving elements being oriented with respect to said mounting foot such that said fishing reels are oriented on said fishing pole to be simultaneously utilized, and further comprising two fishing lines, one of said fishing lines being attached to a respective one of each of said fishing reels, means for conveying attached to one of said lines, a ring attached to said one of said lines and slidably receiving the other of said lines, fishing bait means attached to said other of said lines, and means on said other of said lines for engaging said ring when said other of said lines is reeled in.

* * * * *